United States Patent
Ketola et al.

(10) Patent No.: US 9,632,575 B2
(45) Date of Patent: Apr. 25, 2017

(54) METHOD, AN APPARATUS AND A COMPUTER PROGRAM FOR CONTROLLING AN OUTPUT FROM A DISPLAY OF AN APPARATUS

(75) Inventors: Pekka Ketola, Tampere (FI); Panu Johansson, Tampere (FI); Ari Tolonen, Honkola (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/697,579

(22) PCT Filed: May 21, 2010

(86) PCT No.: PCT/IB2010/052273
§ 371 (c)(1),
(2), (4) Date: Jan. 28, 2013

(87) PCT Pub. No.: WO2011/144972
PCT Pub. Date: Nov. 24, 2011

(65) Prior Publication Data
US 2013/0127707 A1    May 23, 2013

(51) Int. Cl.
| G09G 5/00 | (2006.01) |
| G06F 3/01 | (2006.01) |
| G06F 1/16 | (2006.01) |
| G06F 3/041 | (2006.01) |
| G06F 3/0488 | (2013.01) |

(52) U.S. Cl.
CPC .............. G06F 3/01 (2013.01); G06F 1/1626 (2013.01); G06F 1/1652 (2013.01); G06F 1/1694 (2013.01); G06F 3/0414 (2013.01); G06F 3/0416 (2013.01); G06F 3/0488 (2013.01)

(58) Field of Classification Search
CPC ........ G06F 3/01; G06F 3/0416; G06F 3/0488; G06F 3/0414; G06F 1/1652; G06F 1/1626; G06F 1/1694
USPC ................. 345/156–184; 710/1–74
See application file for complete search history.

(56) References Cited

U.S. PATENT DOCUMENTS

| 1,410,366 A | 3/1922 | Buchman |
| 1,619,502 A | 3/1927 | Fox ................ 16/358 |
| 2,311,470 A | 2/1943 | Ritter |
| 3,148,724 A | 9/1964 | Chieger |
| 3,297,077 A | 1/1967 | Garbus ............ 160/118 |
| 3,324,930 A | 6/1967 | Colombo |
| 3,363,383 A | 1/1968 | La Barge |
| 3,570,579 A | 3/1971 | Matsushima |
| 3,880,500 A | 4/1975 | Kojabashian ........ 359/847 |
| 4,344,475 A | 8/1982 | Frey |

(Continued)

FOREIGN PATENT DOCUMENTS

| CN | 1598870 A | 3/2005 |
| CN | 1617614 A | 5/2005 |

(Continued)

OTHER PUBLICATIONS

"Nokia patent application points to flexible phone displays"; Donald Melanson, Publication date: Jan. 19, 2010.

(Continued)

*Primary Examiner* — Michael Pervan
*Assistant Examiner* — Andrew Lee
(74) *Attorney, Agent, or Firm* — Harrington & Smith

(57) ABSTRACT

A method including: displaying information corresponding to a first output state, temporarily displaying information corresponding to a second output state while a user actuation is occurring; and displaying information corresponding to the first output state when the user actuation is no longer occurring.

20 Claims, 7 Drawing Sheets

(56) References Cited

U.S. PATENT DOCUMENTS

Figure 1:
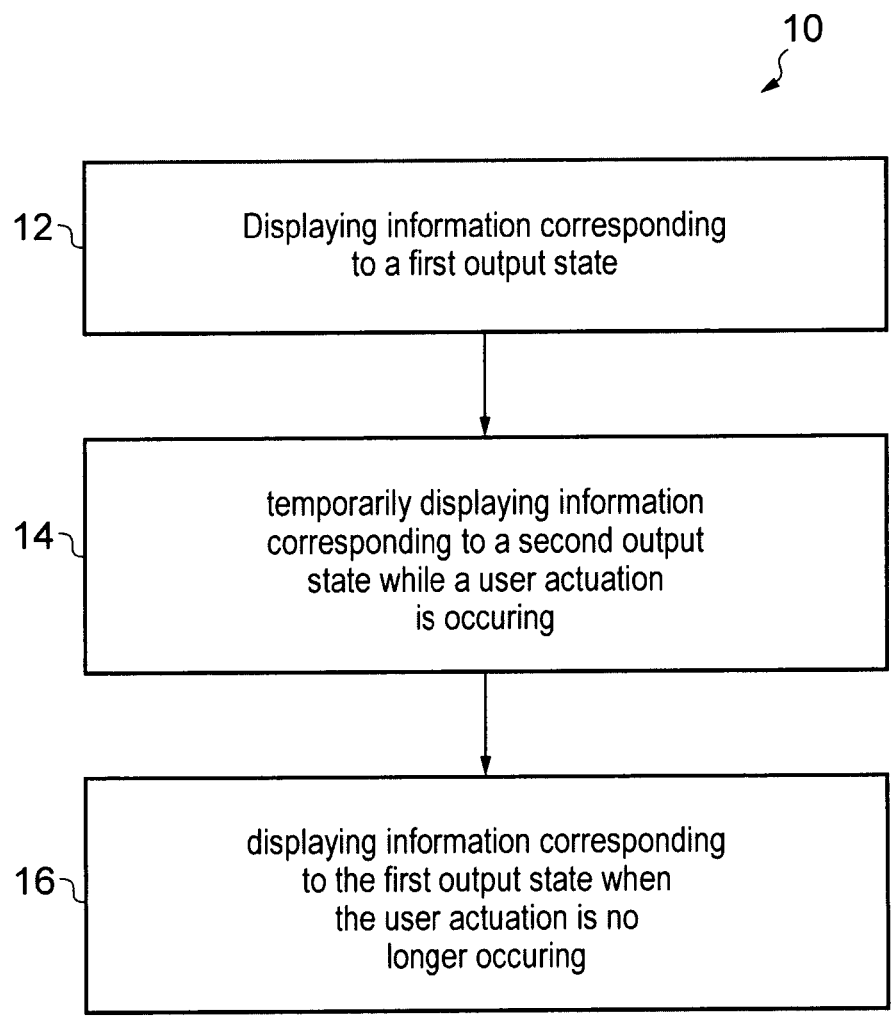

| | | | | |
|---|---|---|---|---|
| 4,438,605 A | 3/1984 | DeLucia | | 16/225 |
| 4,483,020 A | 11/1984 | Dunn | | 2/2.5 |
| 4,716,698 A | 1/1988 | Wilson | | |
| 4,762,020 A | 8/1988 | Schmidberger | | |
| 4,785,565 A | 11/1988 | Kuffner | | |
| 5,007,108 A | 4/1991 | Laberge et al. | | 2/2 |
| 5,133,108 A | 7/1992 | Esnault | | |
| 5,148,850 A | 9/1992 | Urbanick | | |
| 5,176,463 A | 1/1993 | Kraus | | 16/227 |
| 5,214,623 A | 5/1993 | Seager | | 368/10 |
| 5,488,982 A | 2/1996 | Rejc | | |
| 5,588,167 A | 12/1996 | Pahno et al. | | 5/606 |
| 5,613,541 A | 3/1997 | Bradbury | | 160/231.2 |
| 5,706,026 A | 1/1998 | Kent et al. | | 345/156 |
| 5,771,489 A | 6/1998 | Snedeker | | 2/12.5 |
| 5,795,430 A | 8/1998 | Beeteson et al. | | 156/350 |
| 5,923,318 A | 7/1999 | Zhai et al. | | 345/157 |
| 6,016,176 A | 1/2000 | Kim et al. | | 349/58 |
| 6,160,540 A | 12/2000 | Fishkin et al. | | 345/184 |
| 6,378,172 B1 | 4/2002 | Schrage | | 16/225 |
| 6,441,809 B2 | 8/2002 | Kent et al. | | 345/177 |
| 6,556,189 B1 | 4/2003 | Takahata et al. | | 345/173 |
| 6,557,177 B2 | 5/2003 | Hochmuth | | 2/159 |
| 7,075,527 B2 | 7/2006 | Takagi et al. | | 345/184 |
| 7,443,380 B2 | 10/2008 | Nozawa | | 345/156 |
| 7,446,757 B2 | 11/2008 | Mochizuki | | 345/168 |
| 7,456,823 B2 | 11/2008 | Poupyrev et al. | | 345/173 |
| 8,194,399 B2 | 6/2012 | Ashcraft et al. | | 361/679.05 |
| 8,380,327 B2 | 2/2013 | Park | | 700/1 |
| 8,581,859 B2 | 11/2013 | Okumura et al. | | |
| 8,619,021 B2 | 12/2013 | Hayton | | 345/107 |
| 8,780,540 B2 | 7/2014 | Whitt et al. | | 361/679.09 |
| 8,780,541 B2 | 7/2014 | Whitt et al. | | 361/679.09 |
| 8,804,324 B2 | 8/2014 | Bohn | | 345/1.1 |
| 8,929,085 B2 | 1/2015 | Franklin et al. | | |
| 8,999,474 B2 | 4/2015 | Casteras | | |
| 2001/0033275 A1 | 10/2001 | Kent et al. | | 345/173 |
| 2002/0033798 A1 | 3/2002 | Nakamura et al. | | 345/156 |
| 2002/0167495 A1 | 11/2002 | Quinn et al. | | 345/173 |
| 2003/0043087 A1 | 3/2003 | Kim | | 345/1.1 |
| 2003/0060269 A1 | 3/2003 | Paulsen et al. | | 463/20 |
| 2003/0144034 A1 | 7/2003 | Hack et al. | | |
| 2003/0147205 A1 | 8/2003 | Murphy | | 361/680 |
| 2003/0210801 A1 | 11/2003 | Naksen et al. | | |
| 2003/0214485 A1 | 11/2003 | Roberts | | 345/173 |
| 2003/0227441 A1 | 12/2003 | Hioki et al. | | 345/156 |
| 2004/0008191 A1 | 1/2004 | Poupyrev et al. | | 345/184 |
| 2004/0017355 A1 | 1/2004 | Shim | | 345/157 |
| 2004/0035994 A1 | 2/2004 | Cho et al. | | 248/276.1 |
| 2004/0046739 A1 | 3/2004 | Gettemy | | |
| 2004/0212588 A1 | 10/2004 | Moriyama | | |
| 2004/0239631 A1 | 12/2004 | Gresham | | |
| 2005/0051693 A1 | 3/2005 | Chu | | 248/371 |
| 2005/0057527 A1 | 3/2005 | Takenaka et al. | | 345/173 |
| 2005/0140646 A1 | 6/2005 | Nozawa | | |
| 2005/0162389 A1 | 7/2005 | Obermeyer et al. | | 345/161 |
| 2005/0237308 A1 | 10/2005 | Autio et al. | | 345/173 |
| 2006/0007151 A1 | 1/2006 | Ram | | 345/163 |
| 2006/0077672 A1 | 4/2006 | Schaak | | |
| 2006/0199999 A1 | 9/2006 | Ikeda et al. | | |
| 2006/0238494 A1 | 10/2006 | Narayanaswami et al. | | 345/156 |
| 2007/0040810 A1 | 2/2007 | Dowe et al. | | 345/173 |
| 2007/0097014 A1 | 5/2007 | Solomon | | |
| 2007/0154254 A1 | 7/2007 | Bevirt | | 403/56 |
| 2007/0205997 A1 | 9/2007 | Lieshout et al. | | 345/204 |
| 2007/0242033 A1 | 10/2007 | Cradick et al. | | 345/156 |
| 2008/0018631 A1 | 1/2008 | Hioki et al. | | |
| 2008/0042940 A1 | 2/2008 | Hasegawa | | 345/76 |
| 2008/0251662 A1 | 10/2008 | Desorbo et al. | | |
| 2009/0058828 A1 | 3/2009 | Jiang et al. | | 345/173 |
| 2009/0088204 A1 | 4/2009 | Culbert et al. | | 455/556.1 |
| 2009/0115734 A1 | 5/2009 | Fredriksson et al. | | 345/173 |
| 2009/0184921 A1 | 7/2009 | Scott et al. | | 345/156 |
| 2009/0219247 A1 | 9/2009 | Watanabe et al. | | 345/157 |
| 2009/0237872 A1 | 9/2009 | Bemelmans et al. | | |
| 2009/0244013 A1 | 10/2009 | Eldershaw | | 345/173 |
| 2009/0326833 A1 | 12/2009 | Ryhanen et al. | | 702/33 |
| 2010/0011291 A1 | 1/2010 | Nurmi | | 715/702 |
| 2010/0013939 A1 | 1/2010 | Ohno et al. | | |
| 2010/0056223 A1 | 3/2010 | Choi et al. | | |
| 2010/0108828 A1 | 5/2010 | Yu et al. | | |
| 2010/0134428 A1 | 6/2010 | Oh | | |
| 2010/0141605 A1* | 6/2010 | Kang et al. | | 345/174 |
| 2010/0164888 A1* | 7/2010 | Okumura et al. | | 345/173 |
| 2010/0228295 A1 | 9/2010 | Whitefield | | |
| 2010/0238612 A1 | 9/2010 | Hsiao et al. | | |
| 2010/0263245 A1 | 10/2010 | Bowser | | |
| 2011/0007000 A1 | 1/2011 | Lim | | |
| 2011/0057873 A1 | 3/2011 | Geissler et al. | | 345/156 |
| 2011/0062703 A1 | 3/2011 | Lopez et al. | | 285/129.1 |
| 2011/0080155 A1 | 4/2011 | Aldridge | | 323/318 |
| 2011/0095999 A1 | 4/2011 | Hayton | | 345/173 |
| 2011/0141053 A1 | 6/2011 | Bulea et al. | | |
| 2011/0141069 A1 | 6/2011 | Hirakata et al. | | |
| 2011/0167391 A1 | 7/2011 | Momeyer et al. | | 715/863 |
| 2011/0181494 A1 | 7/2011 | Wong et al. | | |
| 2011/0193771 A1 | 8/2011 | Chronqvist | | 345/156 |
| 2011/0227822 A1 | 9/2011 | Shai | | 345/156 |
| 2011/0241822 A1 | 10/2011 | Opran et al. | | 340/4.31 |
| 2011/0298786 A1 | 12/2011 | Cho et al. | | |
| 2012/0044620 A1 | 2/2012 | Song | | 361/679.01 |
| 2012/0110784 A1 | 5/2012 | Hsu | | |
| 2012/0162876 A1 | 6/2012 | Kim | | 361/679.01 |
| 2012/0206375 A1 | 8/2012 | Fyke et al. | | 345/173 |
| 2013/0083496 A1 | 4/2013 | Franklin | | |
| 2013/0120912 A1 | 5/2013 | Ladouceur | | 361/679.01 |
| 2013/0178344 A1 | 7/2013 | Walsh et al. | | |
| 2013/0187864 A1 | 7/2013 | Paasovaara et al. | | |
| 2013/0194207 A1 | 8/2013 | Andrew et al. | | |
| 2013/0197819 A1 | 8/2013 | Vanska et al. | | |
| 2013/0286553 A1 | 10/2013 | Vanska et al. | | 361/679.01 |
| 2013/0335929 A1 | 12/2013 | Cavallaro | | 361/749 |
| 2014/0003006 A1 | 1/2014 | Ahn | | 361/749 |

FOREIGN PATENT DOCUMENTS

| | | |
|---|---|---|
| CN | 101430601 A | 5/2009 |
| CN | 201758267 U | 3/2011 |
| EP | 1 657 965 A2 | 5/2006 |
| EP | 1770965 A1 | 4/2007 |
| EP | 1 829 023 | 9/2007 |
| EP | 1830336 A1 | 9/2007 |
| EP | 1 970 886 A1 | 9/2008 |
| EP | 2166443 A2 | 3/2010 |
| EP | 2 202 624 A2 | 6/2010 |
| EP | 2315186 A2 | 4/2011 |
| EP | 2508960 A2 | 10/2012 |
| JP | 2004046792 A | 2/2004 |
| JP | 2004192241 A | 7/2004 |
| KR | 2006-0134130 A | 12/2006 |
| KR | 20090006718 A | 1/2009 |
| KR | 20090006718 A | 1/2009 |
| KR | 20090006807 A | 1/2009 |
| KR | 2009-001161 A | 2/2009 |
| TW | 200404248 A | 3/2004 |
| WO | WO 00/60438 A | 10/2000 |
| WO | 2005093548 A1 | 10/2005 |
| WO | WO 2005/093548 A1 | 10/2005 |
| WO | WO 2006/014230 A2 | 2/2006 |
| WO | WO 2008/150600 A1 | 12/2008 |
| WO | WO-2009/050107 A2 | 4/2009 |
| WO | WO 2010/004080 A1 | 1/2010 |
| WO | WO-2010/041227 A1 | 4/2010 |
| WO | WO 2011117681 A1 | 9/2011 |
| WO | 2011144972 A1 | 11/2011 |
| WO | WO-2013/160737 A1 | 10/2013 |

OTHER PUBLICATIONS

"Intuitive Page-Turning Interface of E-Books on Flexible E-Paper Based on User Studies"; Taichi Tajika, Tomoko Yonezawa, Noriaki Mitsunaga; On pp. 793-796; Publication date: 2008.

(56) References Cited

OTHER PUBLICATIONS

Lahey, Byron et al.; "PaperPhone: Understanding the Use of Bend Gestures in Mobile Devices with Flexible Electronic Paper Displays"; CHI 2011—Session: Flexible Grips & Gestures; May 7-12, 2011; pp. 1303-1312.
Lee, Sang-Su et al; "How Users Manipulate Deformable Displays as Input Devices"; Apr. 10-15, 2010; pp. 1647-1656.
Poupyrev, Ivan; "Gummi: A bendable computer"; http://ivanpoupyrev.com/projects/gummi.php; 1994-2012; whole document (7 pages).
Honig, Zach; "Mrata Tactile conroller TV remote hands-on (video)"; http://www.engadget.com/2011/10/05/murata-tactile-controller-tv-remote-hands-on-video; 2012; whole document (8 pages).
"Press release: revolutionary new paper computer shows flexible future for smartphones and tablets"; http://www.hml/queensu.ca/paperphone; 2012; whole document (2 pages).
Mina; "Samsung Unveils Flexible Android Smartphone"; http://www.androidauthority.com/samsung-unveils-flexible-android-smartphone-24933/; Sep. 21, 2011; whole document (8 pages).
Smith, Matt; "Nokia's kinetic future: flexible screens and a twisted interface"; http://www.engadget.com/2011/10/26/nokias-kinetic-future-flexible-screens-and-a-twisted-interface/; Oct. 26, 2012; whole document (4 pages).

\* cited by examiner

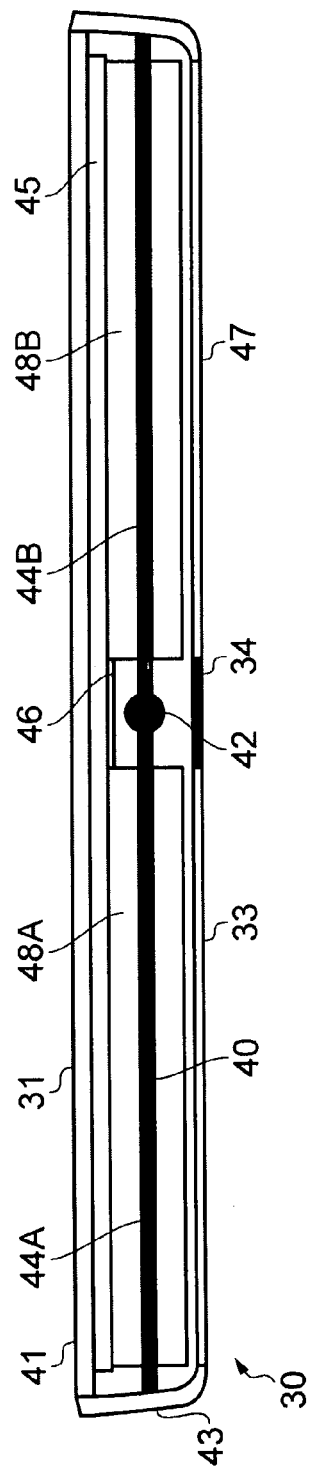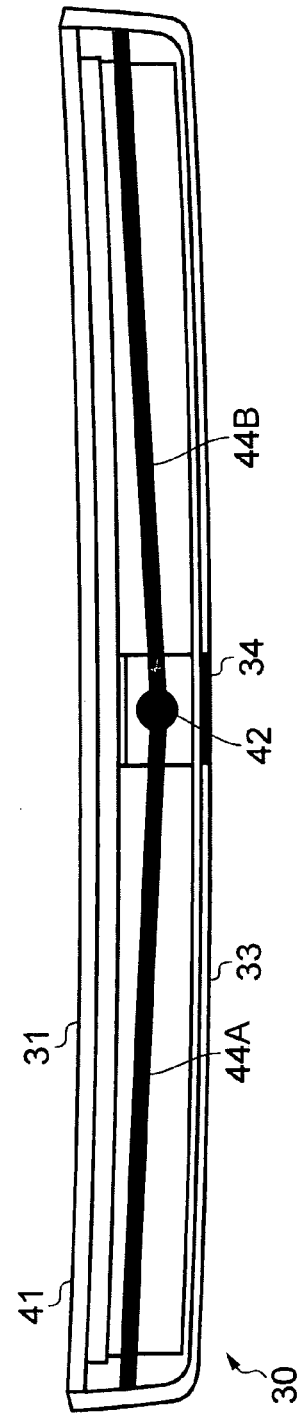

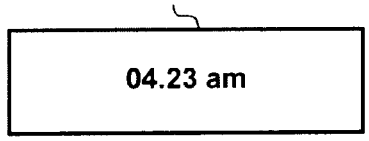
FIG. 8A  FIG. 8B
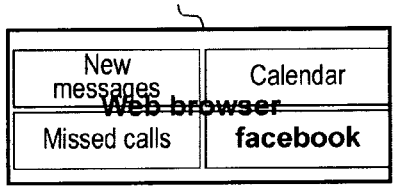
FIG. 9A  FIG. 9B
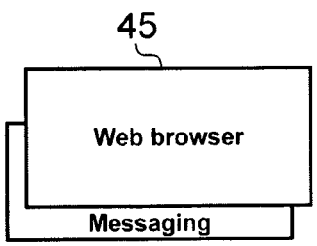
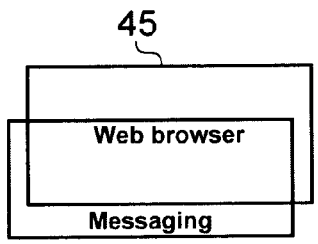
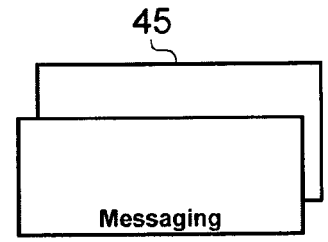
FIG. 10A  FIG. 10B  FIG. 10C
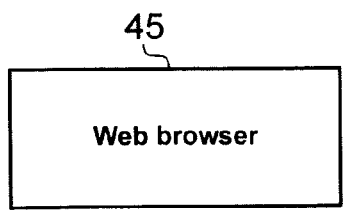
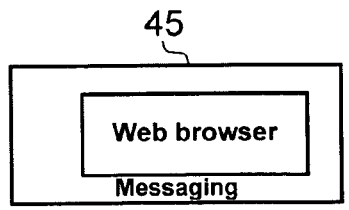
FIG. 11A  FIG. 11B

METHOD, AN APPARATUS AND A COMPUTER PROGRAM FOR CONTROLLING AN OUTPUT FROM A DISPLAY OF AN APPARATUS

TECHNOLOGICAL FIELD

Embodiments of the present invention relate to a method, an apparatus and a computer program. In particular, they relate to method, an apparatus and a computer program for controlling an output from a display of an apparatus.

BACKGROUND

Electronic apparatus now often have displays. However, it is not always possible to display in such a display all the information that a user may wish to view. In such circumstances, it may be necessary to define different output states that have different corresponding information and to provide the user with a way of navigating from one output state to another.

For example, in Microsoft Windows, running applications have an icon in the Windows taskbar. Selecting the icon for an application makes that application the current active application. The output state changes and a screen for the selected application is displayed in front of the screens for the other applications.

BRIEF SUMMARY

According to various, but not necessarily all, embodiments of the invention there is provided a method comprising: displaying information corresponding to a first output state, temporarily displaying information corresponding to a second output state while a user actuation is occurring; and displaying information corresponding to the first output state when the user actuation is no longer occurring.

According to various, but not necessarily all, embodiments of the invention there is provided an apparatus comprising: a sensor configured to respond to a user actuation by generating a sensor signal; at least one processor; and at least one memory comprising computer program code, the at least one memory and the computer program code configured to, with the at least one processor, cause the apparatus at least to perform: controlling a display to display information corresponding to a first output state, when detecting the sensor signal from the sensor responsive to a user actuation, temporarily controlling the display to display information corresponding to a second output state, and when no longer detecting the sensor signal from the sensor, automatically controlling the display to display again information corresponding to the first output state.

According to various, but not necessarily all, embodiments of the invention there is provided an apparatus comprising: sensor means for responding to a user actuation by generating a sensor signal; means for controlling a display to display information corresponding to a first output state, means for temporarily controlling the display to display information corresponding to a second output state while the sensor signal is being generated; and means for controlling the display to display information corresponding to the first output state when the sensor signal is no longer being generated.

According to various, but not necessarily all, embodiments of the invention there is provided a computer program which when loaded into a processor enables the processor to: enable displaying information corresponding to a first output state, enable temporarily displaying information corresponding to a second output state while a user actuation is occurring; and enabling displaying information corresponding to the first output state when the user actuation is no longer occurring.

BRIEF DESCRIPTION

Figure 2:
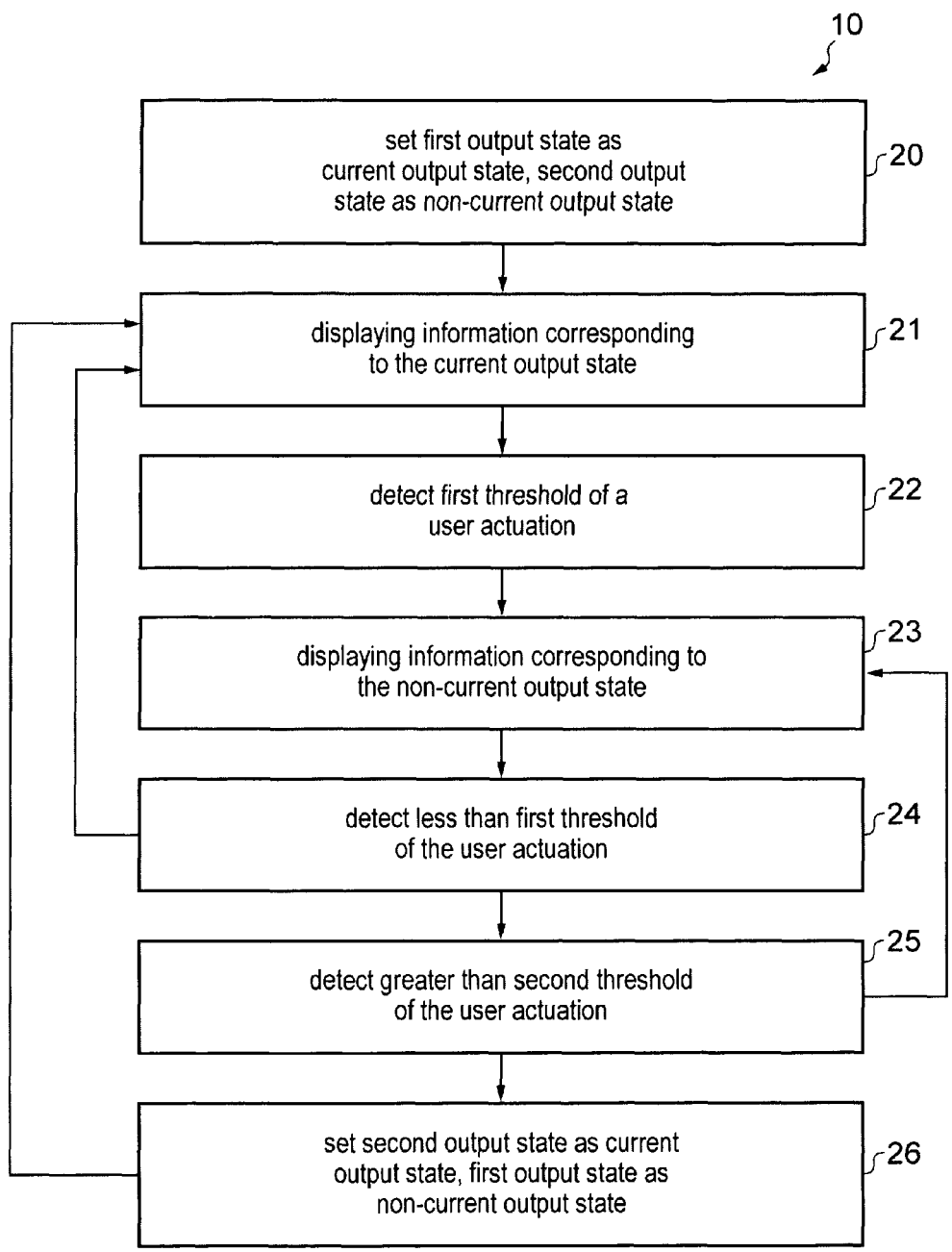
Figure 12:
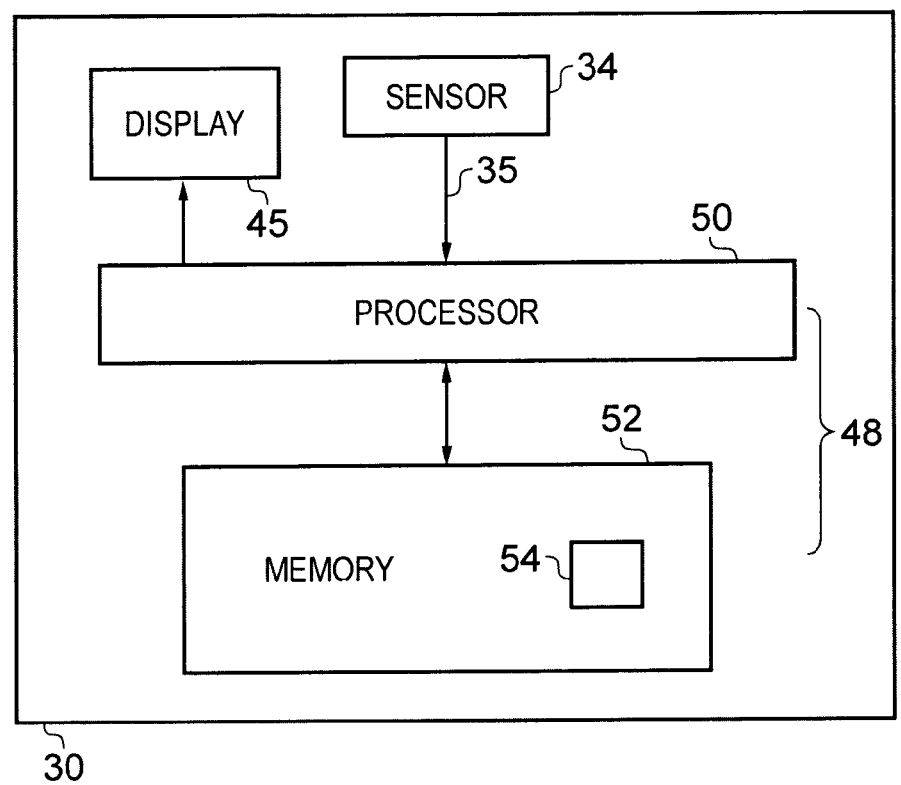

For a better understanding of various examples of embodiments of the present invention reference will now be made by way of example only to the accompanying drawings in which:

FIG. 1 illustrates a method;

FIG. 2 schematically illustrates a suitable method for controlling the output of an apparatus;

FIGS. 3A to 3C, 4A to 4C, 5A to 5C and 6A to 6D schematically illustrate different embodiments of an apparatus in which a user actuation causes a temporary physical deformation of the apparatus and the apparatus temporarily displays information corresponding to a second output state until the user deformation of the apparatus is interrupted;

FIGS. 7A and 7B schematically illustrate an embodiment of the apparatus in which the display output of the apparatus is controlled by bending the apparatus from a non-deformed configuration (FIG. 7A) to a deformed configuration (FIG. 7B);

FIGS. 8A and 8B, FIGS. 9A and 9B, FIGS. 10A, 10B and 10C, FIGS. 11A and 11B schematically illustrate different examples of suitable pairings of first output states and second output states;

FIG. 12 schematically illustrates an example of the apparatus 30; and

Figure 13:
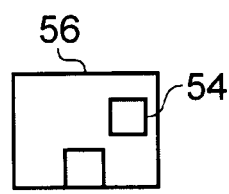

FIG. 13 schematically illustrates a record carrier for a computer program.

DETAILED DESCRIPTION

FIG. 1 illustrates a method 10 comprising: at block 12 displaying information corresponding to a first output state, at block 14 temporarily displaying information corresponding to a second output state while a user actuation is occurring; and at block 16 displaying information corresponding to the first output state when the user actuation is no longer occurring.

The method 10 may be performed at an apparatus 30.

FIGS. 3A to 3C, 4A to 4C, 5A to 5C and 6A to 6D schematically illustrate different embodiments of an apparatus 30 in which a user actuation causes a temporary physical deformation of the apparatus 30. While the physical deformation is occurring, the apparatus 30 temporarily displays information corresponding to a second output state until the user deformation of the apparatus is interrupted and then the apparatus 30 again displays information corresponding to the first output state.

Figure 3A:
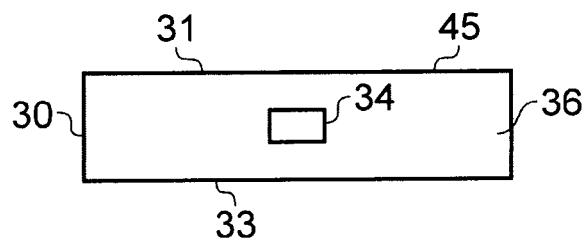

In FIG. 3A, the apparatus 30 is in a non-deformed configuration. The apparatus 30 is displaying information corresponding to a first output state in a display 45 positioned in a front face 31 of the apparatus 30.

Figure 3B:
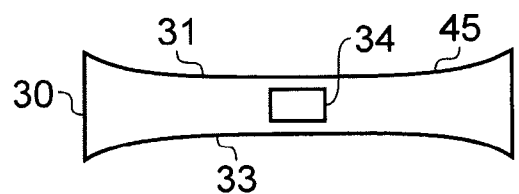

In FIG. 3B, the apparatus 30 is temporarily physically deformed by a user action. In this embodiment, a body 36 of the apparatus is squeezed. A front face 31 of the apparatus 30 is deformed inwardly and also a back face of the apparatus 30 is deformed inwardly. A sensor 34 is configured to detect the deformation of the apparatus 30. While the apparatus 30 is deformed, the sensor 34 generates a sensor signal and the apparatus 30 temporarily displays information corresponding to a second output state in the display 45.

Figure 3C:
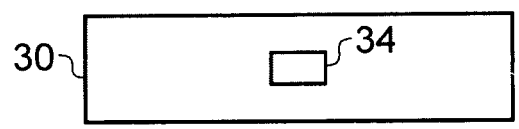

In FIG. 3C, the apparatus 30 is no longer deformed by the user and the apparatus has returned to the non-deformed configuration. The sensor 34 is no longer generating the sensor signal. The apparatus 30 is again displaying information corresponding to the first output state in the display 45.

Figure 4A:
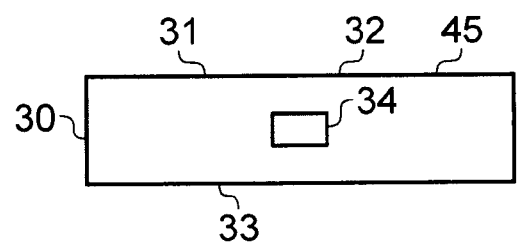

In FIG. 4A, the apparatus 30 is in a non-deformed configuration. The apparatus 30 is displaying information corresponding to a first output state in a display 45 positioned in a front face 31 of the apparatus 30.

Figure 4B:
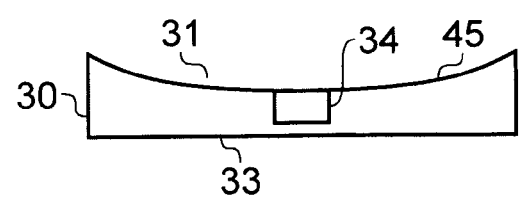

In FIG. 4B, the apparatus 30 is temporarily physically deformed by a user action. In this embodiment, the front face 31 of the apparatus 30 is inwardly deformed or bent. A sensor 34 is configured to detect the deformation of the front face 31 of the apparatus 30. While the apparatus 30 is deformed, the sensor 34 generates a sensor signal and the apparatus 30 temporarily displays information corresponding to a second output state in the display 45.

Figure 4C:
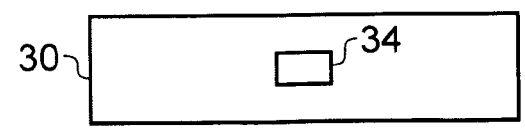

In FIG. 4C, the apparatus 30 is no longer deformed by the user and the apparatus 30 has returned to the non-deformed configuration. The sensor 34 is no longer generating the sensor signal. The apparatus 30 is again displaying information corresponding to the first output state in the display 45.

Figure 5A:
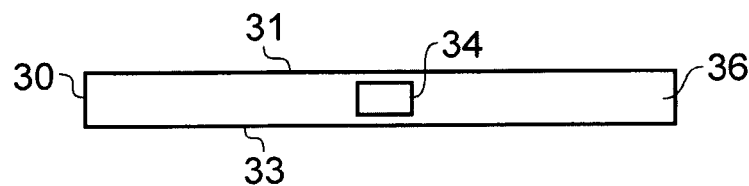

In FIG. 5A, the apparatus 30 is in a non-deformed configuration. The apparatus 30 is displaying information corresponding to a first output state in a display 45 positioned in a front face 31 of the apparatus 30.

Figure 5B:
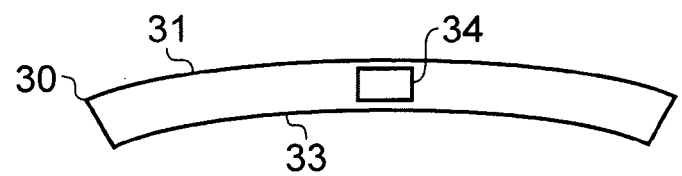

In FIG. 5B, the apparatus 30 is temporarily physically deformed by a user action. In this embodiment, a body 36 of the apparatus is bent. A front face 31 of the apparatus 30 is deformed to form a convex surface and also a back face 33 of the apparatus 30 is deformed to form a concave face. The deformation of the front face 31 extends it whereas the deformation of the back face 33 compresses it.

A sensor 34 is configured to detect the deformation of the apparatus 30. The sensor may, for example, be a compression sensor positioned in association with the back face 33. While the apparatus 30 is deformed, the sensor 34 generates a sensor signal and the apparatus 30 temporarily displays information corresponding to a second output state in the display 45.

Figure 5C:

In FIG. 5C, the apparatus 30 is no longer deformed by the user and the apparatus has returned to the non-deformed configuration. The sensor 34 is no longer generating the sensor signal. The apparatus 30 is again displaying information corresponding to the first output state in the display 45.

Figure 6A:
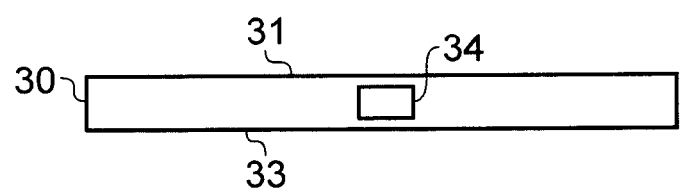

In FIG. 6A, the apparatus 30 is in a non-deformed configuration. The apparatus 30 is displaying information corresponding to a first output state in a display 45 positioned in a front face 31 of the apparatus 30.

Figure 6B:
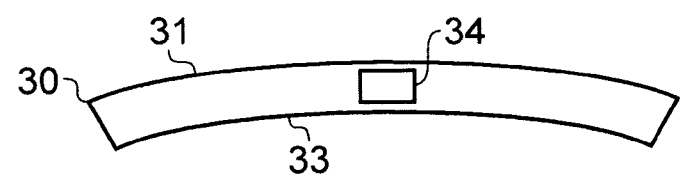

In FIG. 6B, the apparatus 30 is temporarily physically deformed by a user action to first extent. In this embodiment, a body 36 of the apparatus is bent. A front face 31 of the apparatus 30 is deformed to form a convex surface and also a back face 33 of the apparatus 30 is deformed to form a concave face. The deformation of the front face 31 extends it whereas the deformation of the back face 33 compresses it.

A sensor 34 is configured to detect the deformation of the apparatus 30. The sensor may, for example, be a compression sensor positioned in association with the back face 33. While the apparatus 30 is deformed beyond the first extent, the sensor 34 generates a first sensor signal and the apparatus 30 temporarily displays information corresponding to a second output state in the display 45.

If the user now released the deformation of the apparatus 30 so that it returned to the non-deformed configuration, then the apparatus 30 would again display information corresponding to the first output state in the display 45.

Figure 6C:
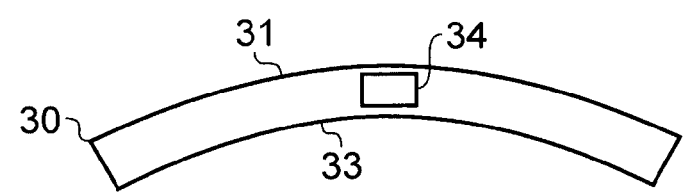

However, in FIG. 6C, instead the apparatus 30 is temporarily physically deformed further in the same sense by the user action to a second extent. In this embodiment, a body 36 of the apparatus is bent further. A front face 31 of the apparatus 30 is deformed to form a more convex surface and also a back face 33 of the apparatus 30 is deformed to form a more concave face. The deformation of the front face 31 further extends it whereas the deformation of the back face 33 further compresses it.

When the apparatus 30 is deformed beyond the first extent to the second extent exceeding a deflection threshold, the sensor 34 generates a second sensor signal. The apparatus 30 now displays information corresponding to the second output state in the display 45 even if the user releases the deformation of the apparatus 30.

Figure 6D:
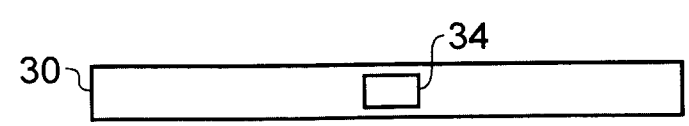

In FIG. 6D, the apparatus 30 is no longer deformed by the user and the apparatus has returned to the non-deformed configuration. The sensor 34 is no longer generating the sensor signal. The apparatus 30 is now displaying information corresponding to the second output state in the display 45 rather than the first output state.

Consequently, by slightly bending the apparatus 30 the user is able to reversibly view the information corresponding to the second output state when the first output state is the current active state. Releasing the bend returns the display to displaying information corresponding to the first output state. However, further bending the apparatus 30 switches the current active state from the first output state to the first output state.

It should be appreciated that the embodiments illustrated in FIGS. 3A to 3C and 4A to 4C may also enable switching of a current output state from the first output state to the second output state by further deforming the apparatus 30 beyond the initial deformation required to display temporarily the information corresponding to the second output state.

FIG. 2 schematically illustrates one example of a suitable method 10 for controlling the output of the apparatus 30.

At block 20, the first output state is set as a current active output state and a second output state is set as a non-current output state.

Next at block 21, information corresponding to the current output state is displayed in display 45.

Next at block 22, it is detected when a user actuation exceeds a first threshold. For example, it may be detected when a deformation of the apparatus 30 exceeds a first deformation threshold by determining when a sensor signal exceeds a first deformation signal threshold.

When it is detected that a user actuation exceeds a first threshold, the method moves to block 23.

Next at block 23, information corresponding to the non-current output state is displayed in the display 45.

Next at block 24, it is detected when a user actuation falls beneath the first threshold because the user has released the actuation. For example, it may be detected when a deformation of the apparatus 30 is less than the first deformation threshold by determining when a sensor signal is less than the first deformation signal threshold.

If it is detected that a user actuation has fallen beneath the first threshold then the method returns to block 21. Otherwise the method proceeds top block 25.

Next at block 25, it is detected when a user actuation exceeds a second threshold. For example, it may be detected when a deformation of the apparatus 30 exceeds a second deformation threshold by determining when a sensor signal exceeds a second deformation signal threshold.

If it is detected that a user actuation has exceeded the second threshold then the method proceeds to block 26. Otherwise the method returns to block 23.

Next at block 26, the second output state is set as a current active output state and the first output state is set as a non-current output state. The method then returns to block 21.

At block 21, information corresponding to the current output state (second output state) is displayed in display 45.

Next at block 22, it is detected when a user actuation exceeds a threshold that may be the same or different to the first threshold. When it is detected that a user actuation exceeds the threshold, the method moves to block 23.

Next at block 23, information corresponding to the non-current output state is displayed in the display 45. The non-current output state may be the first output state or a different output state.

Next at block 24, it is detected when a user actuation falls beneath the threshold because the user has released the actuation. If it is detected that a user actuation has fallen beneath the threshold then the method returns to block 21. Otherwise the method proceeds top block 25.

Next at block 25, it is detected when a user actuation exceeds a further greater threshold. If it is detected that a user actuation has exceeded the further threshold then the method proceeds to block 26. Otherwise the method returns to block 23.

Next at block 26, a non-current output state and the current output state are swapped. The current output state becomes a non-current output state and a different non-current output state becomes the current output state. For example, the first output state may be set as the current active output state and the second output state may be set as a non-current output state. The method then returns to block 21.

In this example it is therefore possible to temporarily toggle between displaying information corresponding to the first and second output states by, for example, performing a first deformation of the apparatus 30 and toggle back by releasing the first deformation. It is therefore possible to permanently toggle the current output state between the first and second output states by, for example, performing a second deformation of the apparatus 30 (releasing this second deformation does not cause a toggle) and to toggle back by performing a third deformation of the apparatus 30 to a greater extent or in a different way (releasing this third deformation does not cause a toggle).

The second deformation may, for example, be similar to the first deformation but to a greater extent. The third deformation may, for example, be similar to but separate to the second deformation or it may be in an opposite sense to the second deformation.

The user can provide input commands to an application corresponding to the current output state but cannot provide input commands to the application(s) corresponding to the non-current output state(s).

FIGS. 7A and 7B schematically illustrate an embodiment of the apparatus 30 in which the display output of the apparatus 30 is controlled by bending the apparatus 30, for example, as previously described with reference to FIGS. 5A to 5C and 6A to 6D.

In FIG. 7A, the apparatus 30 is in a non-deformed configuration.

In FIG. 7B, the apparatus 30 is in a deformed configuration.

In FIGS. 7A and 7B, the apparatus 30 comprises an internal supporting structure 40. The support 40 operates as a rigid skeleton.

A first part 44A of the supporting structure 40 is a rigid limb of the skeleton. It extends, in the non deformed configuration (FIG. 7A) substantially parallel to the front face 31.

A second part 44B of the supporting structure 40 is a rigid limb of the skeleton. It extends, in the non deformed configuration (FIG. 7A) substantially parallel to the front face 31.

A hinge 42 forms a joint of the skeleton positioned between the first part 44A and the second part 44B. The hinge 42 has an axis that extends substantially parallel to the front face 31. The hinge 42 enables the first part 44A and the second part 44B to rotate about the axis when the apparatus 30 is bent (FIG. 7B).

The first part 44A provides a rigid support for first functional circuitry 48A and the second part 44B provides a rigid support for second functional circuitry 48B. The first functional circuitry 48A and the second functional circuitry 48B are electrically interconnected via an interconnecting flex 46. The combination of the first functional circuitry 48A and the second functional circuitry 48B provide the components that, in combination, enable the apparatus 30 to operate. They may, for example, include a controller. Implementation of the controller can be in hardware alone (a circuit, a processor etc), have certain aspects in software including firmware alone or can be a combination of hardware and software (including firmware). The controller may be implemented using instructions that enable hardware functionality, for example, by using executable computer program instructions in a general-purpose or special-purpose processor that may be stored on a computer readable storage medium (disk, memory etc) to be executed by such a processor.

The apparatus 30 comprises a housing 43 that has plastic sidewalls, a thin plastic window 41 at the front face 31 of the apparatus overlying the display 45 and soft plastic material 47 at the back face 33 of the apparatus 30.

The deformation sensor 34 is integrated into the back face 33. In this example, it is positioned underneath the hinge 42.

A temporary physical deformation by the user bends the supporting structure 40 at the hinge 42. This is detected by the deformation sensor 44 which is temporarily deformed.

FIGS. 8A and 8B schematically illustrate one example of a suitable first output state (FIG. 8A) and second output state (FIG. 8B).

In FIG. 8A, the first output state is an inactive state (e.g. idle state or sleep state) and the information displayed is sleep state information. In this example, the display 45 is switched off and no information is displayed.

In FIG. 8B, the second output state is a clock state and the information corresponding to the second output state that is displayed is a time. Thus the time can be displayed without exiting the low energy sleep state.

FIGS. 9A and 9B schematically illustrate one example of a suitable first output state (FIG. 9A) and second output state (FIG. 9B).

In FIG. 9A, there are a large number of running applications including a web browser, a messaging application, a calendar application, a missed calls application and a Facebook (Trade Mark) application. The current active application is the web browser application. The first output state is the output screen from the web-browser.

In FIG. 9B, the second output state displays information relating to the other applications (the messaging application, the calendar application, the missed calls application and the Facebook (Trade Mark) application).

FIGS. 10A and 10B schematically illustrate one example of a suitable first output state (FIG. 10A) and second output state (FIG. 10B).

In FIG. 10A, there is a web browser running and a messaging application running. The current active application is the web browser application. The first output state is the output screen from the web-browser.

In FIG. 10B, after an initial deformation of the apparatus 30, the second output state displays information relating to the messaging application. The whole output screen of the messaging application is visible. The web browser application is still the current active application.

In FIG. 10C, after a further deformation of the apparatus 30, the messaging application becomes the current active application. The whole output screen of the messaging application is now displayed as a default.

FIGS. 11A and 11B schematically illustrate one example of a suitable first output state (FIG. 11A) and second output state (FIG. 11B).

In FIG. 11A, there is a web browser running and a messaging application running. The current active application is the web browser application. The first output state is the output screen from the web-browser.

In FIG. 10B, after an initial deformation of the apparatus 30, the second output state displays some information relating to the messaging application. Part of the output screen of the messaging application is visible but at least a part of the web browser screen is also visible.

FIG. 12 schematically illustrates an example of the apparatus 30. The apparatus may, for example, be a hand-portable electronic apparatus that is sized to fit into an inside breast pocket of a jacket and/or to be held in the palm of a human hand. The hand-portable electronic device may be operable as a mobile cellular telephone, a personal media player (music, video, and/or books), a personal digital assistant and/or a personal computer.

The apparatus 30 comprises a sensor 34 configured to respond to a user actuation by generating a sensor signal 35. The sensor 34 may be a deformation sensor configured to detect deformation of the apparatus 30 and configured to generate a sensor signal 35 in response to physical deformation of the apparatus 30.

The sensor 34 may, for example, be positioned at a surface of the apparatus and may be configured to generate a sensor signal 35 in response to physical deformation of the surface of the apparatus 30.

The sensor 34 may, for example, be positioned at an interior of the apparatus 30 and may be configured to generate a sensor signal 35 in response to physical deformation of a supporting structure of the apparatus 30.

The apparatus 30 also comprises a display 45, at least one processor 50; and at least one memory 52 including computer program code 54.

The at least one memory 52 and the computer program code 54 are configured to, with the at least one processor 50, cause the apparatus 30 at least to perform:
controlling a display 45 to display information corresponding to a first output state,
when detecting the sensor signal 35 from the sensor 34 responsive to a user actuation, temporarily controlling the display 45 to display information corresponding to a second output state, and
when no longer detecting the sensor signal 35 from the sensor 34, automatically controlling the display 45 to display again information corresponding to the first output state.

The processor 50 is configured to read from and write to the memory 52. The processor 50 may also comprise an output interface via which data and/or commands are output by the processor and an input interface via which data and/or commands are input to the processor 50.

The memory 52 stores a computer program 54 comprising computer program instructions that control the operation of the apparatus 30 when loaded into the processor 50. The computer program instructions 54 provide the logic and routines that enables the apparatus to perform the methods illustrated in the Figs. The processor 50 by reading the memory 52 is able to load and execute the computer program 54.

The computer program may arrive at the apparatus 30 via any suitable delivery mechanism 56 (FIG. 13). The delivery mechanism 56 may be, for example, a computer-readable storage medium, a computer program product, a memory device, a record medium such as a CD-ROM or DVD, an article of manufacture that tangibly embodies the computer program 54. The delivery mechanism may be a signal configured to reliably transfer the computer program 54.

The apparatus 30 may propagate or transmit the computer program 54 as a computer data signal.

Although the memory 54 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device."

The blocks illustrated in the FIGS. 1 and 2 may represent operations in a method and/or sections of code in the computer program 54. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A method comprising:
   displaying information corresponding to a first output state;
   in response to recognition that a temporary bending of a body of an apparatus is occurring, wherein the bending does not exceed a predetermined threshold, temporarily displaying information corresponding to a second output state;
   returning to the display of information corresponding to the first output state response to recognition that the temporary bending of the body of the apparatus is no longer occurring; and
   in response to detection that the temporary bending of the body of the apparatus is occurring, wherein the temporary bending exceeds the predetermined threshold, displaying information corresponding to the second output state, with the information corresponding to the second output state continuing to be displayed upon cessation of temporary bending of the body of the apparatus.

2. The method of claim 1, comprising:
   temporarily displaying information corresponding to the second output state while a temporary bending of the body of the apparatus is occurring until the temporary bending of the body of the apparatus is interrupted and then displaying information corresponding to the first output state.

3. The method of claim 1, wherein the temporary bending of the body of the apparatus comprises a temporary physical deformation of an internal supporting structure of the apparatus.

4. The method of claim 1, wherein the apparatus has a front face comprising a display for display information and a back face, wherein bending the body of the apparatus compresses one of the faces and extends the other of the faces.

5. The method of claim 4, wherein the temporary bending of the body of the apparatus is detected by a compression sensor is a compression sensor positioned in association with the back face.

6. The method of claim 1, wherein the temporary bending of the body of the apparatus exceeds a threshold when a temporary physical deformation of an actuator exceeds a deformation threshold.

7. The method of claim 1, wherein the temporary bending of the body of the apparatus exceeds a threshold when the temporary bending of the apparatus exceeds a deflection threshold.

8. The method of claim 1, wherein a pairing of the first output state and the second output state is selected from the group comprising:
   information corresponding to the first output state is inactive state information and information corresponding to the second output state comprises additional or different information;
   information corresponding to the first output state is a content of a page of a document and information corresponding to the second output state is a content of later pages of the document;
   information corresponding to the first output state is a screen for a currently active one of multiple running applications each having a respective screen and information corresponding to the second state is at least part of a screen for one of the multiple running applications that is not active;
   information corresponding to the first state is a screen for a currently active one of multiple running applications each having a respective screen and
   information corresponding to the second state is a whole of a screen for one of the multiple running applications that is not active.

9. An apparatus comprising:
   a sensor configured to respond to a temporary bending of the body of the apparatus by generating a sensor signal;
   at least one processor; and
   at least one memory comprising computer program code, the at least one memory and the computer program code configured to, with the at least one processor, cause the apparatus at least to perform: controlling a display to display information corresponding to a first output state, in response to detecting the sensor signal from the sensor, wherein the sensor signal is generated in response, to a temporary bending of the body of the apparatus that does not exceed a predetermined deformation threshold, temporarily controlling the display to display information corresponding to a second output state;
   in response cessation of detection of the sensor signal from the sensor, automatically controlling the display to return to display of information corresponding to the first output state; and
   in response to detection of the sensor signal, wherein detection of the sensor signal indicates the temporary bending of the body of the apparatus exceeding the predetermined deformation threshold, display information corresponding to the second output state, with the information corresponding to the second output state continuing to be displayed upon cessation of temporary bending of the body of the apparatus.

10. The apparatus of claim 9, wherein the sensor is configured to generate a sensor signal in response to physical deformation of the sensor.

11. The apparatus of claim 9, wherein the sensor is positioned at a surface of the apparatus and is configured to generate the sensor signal in response to physical deformation of the surface of the apparatus.

12. The apparatus of claim 9, wherein the sensor is positioned at an interior of the apparatus and is configured to generate the sensor signal in response to physical deformation of a supporting structure of the apparatus.

13. The apparatus of claim 9, wherein the sensor is configured to generate the sensor signal in response to bending of the apparatus.

14. The apparatus of claim 13, wherein the apparatus has a front face comprising a display for displaying information and a back face, wherein bending the apparatus compresses one of the faces and extends the other of the faces.

15. The apparatus of claim 14, wherein the apparatus has a front face comprising a display for displaying information and a back face, wherein bending the apparatus compresses the back face and extends the other of the faces and wherein the sensor is a compression sensor positioned in association with the back face.

16. The apparatus of claim 9, wherein the sensor is configured to generate the sensor signal in excess of the threshold in response to physical deformation of the apparatus beyond a deformation threshold.

17. The apparatus of claim 9, wherein the sensor is configured to generate a sensor signal in excess of the threshold in response to bending of the apparatus beyond a deflection threshold.

18. An apparatus comprising:
   sensor means for responding to a temporary bending of a body of the apparatus by generating a sensor signal that increases as the degree of bending increases;
   means for controlling a display to display information corresponding to a first output state;
   means for temporarily controlling the display to display information corresponding to a second output state while the sensor signal is being generated, wherein the sensor signal is generated in response to a temporary bending of the body of the apparatus;
   means for, in response to cessation of detection of the sensor signal from the sensor, controlling the display to return to display of information corresponding to the first output state; and
   means for, in response to detection of the sensor signal; wherein detection of the sensor signal indicates the temporary bending of the body of the apparatus exceeding the predetermined deformation threshold, exceeds the predetermined threshold, displaying information corresponding to the second output state, with the information corresponding to the second output state continuing to be displayed upon cessation of temporary bending of the body of the apparatus.

19. An apparatus comprising means for performing the method of claim 1.

20. A non-transitory computer readable medium storing a program of instructions, execution of which by a processor configures an apparatus to at least:
   enable displaying information corresponding to a first output state;
   in response to recognition that a temporary bending of a body of an apparatus is occurring, wherein the bending does not exceed a predetermined threshold, enable temporarily displaying information corresponding to a second output state;
   enable returning to displaying information corresponding to the first output state in response to recognition that the temporary bending of the body of the apparatus is no longer occurring; and
   in response to detection of temporary bending of the body of the apparatus exceeding the predetermined threshold,
   display information corresponding to the second output state, with the information corresponding to the second output state continuing to be displayed upon cessation of temporary bending of the body of the apparatus.

* * * * *